US012492242B2

(12) United States Patent
Liu et al.

(10) Patent No.: US 12,492,242 B2
(45) Date of Patent: Dec. 9, 2025

(54) SINGLE DOMAIN ANTIBODIES THAT BIND AND NEUTRALIZE VENEZUELAN EQUINE ENCEPHALITIS VIRUS

(71) Applicant: The Government of the United States of America, as represented by the Secretary of the Navy, Arlington, VA (US)

(72) Inventors: Jinny Lin Liu, Ellicott City, MD (US); Dan Zabetakis, Brandywine, MD (US); Ellen R. Goldman, Germantown, MD (US); George P. Anderson, Bowie, MD (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 409 days.

(21) Appl. No.: 17/853,050

(22) Filed: Jun. 29, 2022

(65) Prior Publication Data
US 2023/0050657 A1  Feb. 16, 2023

Related U.S. Application Data

(60) Provisional application No. 63/224,642, filed on Jul. 22, 2021.

(51) Int. Cl.
*C07K 16/10* (2006.01)
*A61K 39/00* (2006.01)

(52) U.S. Cl.
CPC .... *C07K 16/1081* (2013.01); *A61K 2039/552* (2013.01); *C07K 2317/569* (2013.01)

(58) Field of Classification Search
CPC .......... C07K 16/1081; C07K 2317/569; C07K 2317/22; A61K 2039/552; G01N 33/56983; G01N 2333/181; A61P 31/12
See application file for complete search history.

(56) References Cited

U.S. PATENT DOCUMENTS

| 6,261,570 B1 | 7/2001 | Parker et al. |
| 6,824,778 B2 | 11/2004 | Hart |
| 7,371,849 B2 | 5/2008 | Honda et al. |
| 8,501,157 B2 | 8/2013 | Hu et al. |
| 2008/0134778 A1 | 6/2008 | Osswald et al. |
| 2015/0056230 A1 | 2/2015 | Dupuy et al. |
| 2020/0024331 A1 | 1/2020 | Liu |

FOREIGN PATENT DOCUMENTS

WO    2021-042021    3/2021

OTHER PUBLICATIONS

De Genst, E. et al. Antibody repertoire development in camelids. 2005 Dev Comp Immunol 30; 187-198. (Year: 2006).*
Deschacht, N. et al. A Novel Promiscuous Class of Camelid Single-Domain Antibody Contributes to the Antigen-Binding Repertoire. 2010. J Immunol 184 (10); 5696-5704. (Year: 2010).*
Nakakido, M. et al. Development of novel humanized VHH synthetic libraries based on physicochemical analyses. 2024. Scientific Reports 14 (19533); 1-13. (Year: 2024).*
Sircar, A. et al. Analysis and Modeling of the Variable Region of Camelid Single-Domain Antibodies. 2011. J Immunol 2011 (11); 6357-6467. (Year: 2011).*
Tereshko, V. et al. Toward chaperone-assisted crystallography: Protein engineering enhancement of crystal packing and X-ray phasing capabilities of a camelid single-domain antibody (VHH) scaffold. 2008. Protein Science 17; 1175-1187. (Year: 2008).*
Hunt, A.R., Frederickson, S., Maruyama, T., Roehrig, J.T. and Blair, C.D., 2010, The first human epitope map of the alphaviral E1 and E2 proteins reveals a new E2 epitope with significant virus neutralizing activity. PLoS Negl Trop Dis 4, e739.
Liu et al., "Bivalent single domain antibody constructs for effective neutralization of Venezuelan equine encephalitis." Scientific Reports 12, Article No. 700 (2022).
International Search Report mailed Nov. 1, 2022 in PCT/US2022/035483.
Written Opinion of the International Searching Authority mailed Nov. 1, 2022 in PCT/US2022/035483.
Extended European Search Report, EPO Application No. 22846395. 6, mailed May 27, 2025.
Jinny Lin Liu, "Stabilization of a Broadly Neutralizing Anti-Chikungunya Virus Single Domain Antibody," Frontiers in Medicine, vol. 8, Jan. 28, 2021, pp. 1-6.

* cited by examiner

*Primary Examiner* — Chun W Dahle
*Assistant Examiner* — Grace H Lunde
(74) *Attorney, Agent, or Firm* — US Naval Research Laboratory; Fariborz Moazzam

(57) ABSTRACT

Described herein are single-domain antibodies that might serve as alternatives to conventional monoclonal antibodies for either the detection or treatment of Venezuelan equine encephalitis virus (VEEV).

2 Claims, 3 Drawing Sheets
Specification includes a Sequence Listing.

FIG. 2

| VEEV sdAb | PRNT50 (µg/mL) | PRNT80 (µg/mL) |
|---|---|---|
| V2B3 | 0.95 ± 0.42 | 2.7 ± 0.1 |
| V8C3 | 40.4 ± 27.7 | 458 ± 5 |
| V11A1 | 2.8 ± 0.8 | 8.7 ± 2.3 |
| V3A8 | 0.16 ± 0.02 | 0.8 ± 0.2 |
| V3G5 | 3.9 ± 0.8 | 31 ± 8 |
| V2C3 | 5.5 ± 1.6 | 10 ± 2 |
| V2G1 | 74 ± 49 | 506 ± 440 |
| V3G9 | 240 | 74000 |

FIG. 3A

| VEEV construct(s) | TC-83 PRNT50 (ng/mL) | PRNT50 fold-enhancement | TC-83 PRNT80 (ng/mL) | PRNT80 fold-enhancement |
|---|---|---|---|---|
| Mix of V2B3 +V3A8f | 36.40±3.82 | - | 204.3±100.1 | - |
| V3A8f-V2B3 | 0.76±0.16 (STDEV) | 48 | 1.68±0.74 | 122 |
| V2B3-V3A8f | 0.82±0.17 | 44 | 1.63±0.67 | 125 |
| V3A8f | 216.0±84.9 | - | 1285.0±7.07 | - |
| V3A8f-V3A8f | 0.81±0.19 | 267 | 13.2±16.8 | 97 |
| Mix of V8C3+V3A8f | 96.3±9.48 | - | 481.5±191.6 | - |
| V8C3-V3A8f | 11.0±3.61 | 9 | 23.6±0.78 | 20 |
| Mix of V2C3 + V3A8f | 204.0±66.5 | - | 631.0±29.7 | - |
| V3A8f-V2C3 | 1.65±0.35 | 124 | 6.35±0.64 | 99 |
| V2C3-V3A8f | 0.71±0.24 | 287 | 1.45±0.07 | 435 |
| V2B3 | 950±420 | - | 2670±110 | - |
| V2B3-V2B3 | 12.10±2.83 | 78 | 40.4±2.69 | 66 |
| Mix of V2C3 + CC3 | 1345±521 | - | 4128±2966 | - |
| CC3-V2C3 | 179.4±41.9 | 7 | 482.9±66.6 | 9 |
| V2C3 | 5480±1620 | - | 10230±1980 | - |
| V2C3-V2C3 | 157.0±6.8 | 35 | 328.0±157.8 | 31 |

FIG. 3B

SINGLE DOMAIN ANTIBODIES THAT BIND AND NEUTRALIZE VENEZUELAN EQUINE ENCEPHALITIS VIRUS

CROSS-REFERENCE TO RELATED APPLICATIONS

This application claims the benefit of U.S. Provisional Patent Application No. 63/224,642 filed 22 Jul. 2021, the entirety of which is incorporated herein by reference.

FEDERALLY-SPONSORED RESEARCH AND DEVELOPMENT

The United States Government has ownership rights in this invention. Licensing inquiries may be directed to Office of Technology Transfer, US Naval Research Laboratory, Code 1004, Washington, DC 20375, USA; +1.202.767.7230; techtran@nrl.navy.mil, referencing NC 113775.

INCORPORATION BY REFERENCE

The instant application contains a Sequence Listing which has been submitted electronically in ASCII format and is hereby incorporated by reference in its entirety. Said ASCII copy, created on Jun. 29, 2022, is named 113775US2-WO1-sequences_ST25.txt and is 20,247 bytes in size.

BACKGROUND

Venezuelan equine encephalitis virus (VEEV), a member of the alphavirus genus of the family Togaviridae, is an important mosquito-borne pathogen in humans and equines. VEEV infections mainly target the central nervous system and lymphoid tissues causing severe encephalitis in equines and a spectrum of human diseases ranging from unapparent or Sub-clinical infection to acute encephalitis. Neurological disease appears in 4-14% of cases. The incidence of human infection during equine epizootics could be up to 30%. Mortality associated with the encephalitis in children is as high as 35%. Outbreaks in Venezuela and Colombia in 1995 resulted in around 100,000 human cases with more than 300 fatal encephalitis cases. Furthermore, VEEV is highly infectious by aerosol inhalation in humans and other animals.

It is not believed that any antiviral drugs have been shown effective against VEEV. While two forms of investigational new drug VEEV vaccines have been made available for human and veterinary use, they are far from satisfactory. For example, approximately 20% of recipients that receive one vaccine fail to develop neutralizing Abs, while another 20% exhibit reactogenicity, and furthermore this vaccine could revert to wild-type form. The other vaccine requires multiple immunizations, periodic boosts, and fails to provide protection against aerosol challenge in some rodent models.

Like the other alphaviruses, VEEV is an enveloped virus, with three structural proteins: a capsid encapsulating the viral RNA genome, and two envelope glycoproteins, E1 and E2. E1 and E2 form heterodimers, which project from the virus envelope as trimer spikes. Epitopes on the spikes are the targets of neutralizing Abs. Studies have shown that the viral neutralizing epitopes are mainly located on the E2 protein, and that the E2C epitope appears to be the hub of the neutralization epitopes. The murine monoclonal Ab (mAb) 1A4A114 is specific for E2C. This mAb has been shown to be efficient in protecting animals from a lethal peripheral challenge with virulent VEEV. Murine mAbs, however, have serious disadvantages as therapeutic agents in humans. For example, one of the problems associated with using murine mAbs in humans is that they may induce an anti-mouse Ab response. Furthermore, repeating administration of murine mAbs may result in rapid clearance of the murine mAbs and anaphylaxis, which can sometimes be fatal. The humanization of murine mAbs has been proposed to reduce immunogenicity of Abs in humans. However, these are still large complex molecules that can be expensive to produce, have short shelf lives which require maintenance of a cold chain. In addition due to their size, they fail to cross the blood brain barrier thus are ineffective to treat encephalitic infections, and they are difficult to bioengineer to possess additional desired properties.

For detection applications, many immunoassays rely on monoclonal or polyclonal antibodies (IgG) derived from mice, rabbits, goats, or sheep as recognition elements. Functional IgG are comprised of four polypeptide chains, two identical heavy (H) chains and two identical light (L) chains, linked by disulfide bonds. Each antibody has two antigen binding domains formed by the interaction of adjacent variable (V) domains from the H and L chains. The antigen binding surface is composed of six complementarity-determining regions (CDRs), three residing in each of the VH and VL protein domains. The interaction of these six CDR loops of varying sizes and sequences allows the formation of diversified antigen binding surfaces with the topologies to recognize a wide range of antigenic targets. Although sensitive and specific, conventional antibodies can be time-consuming and expensive to develop and have limited stability. FIG. 1 shows a schematic representation of IgG as well as the cloned binding derivative. Cloned derivatives of conventional IgG, comprising just the VH and VL domains to form a minimal antigen binding construct have been used as recognition elements for biosensor applications. These single chain antibodies (scFv) can be expressed in bacteria and modified by protein engineering to tailor the functionality and properties of the antibody fragments. ScFv, however, are often less stable than the parental full-length antibodies and just like full-length antibodies, they aggregate irreversibly at elevated temperatures due to their two-domain structure. Ideally, development of a single-domain structure capable of antigen binding would avoid aggregation upon heating and would facilitate the application of biosensors at elevated environmental temperatures or for continuous use over long periods of time.

Certain animals, such as camelids (i.e. camels, llamas) and sharks, possess a class of immunoglobulins consisting of heavy-chain homodimers where antigen binding is mediated through a single V domain. These V domains, when cloned as single domain antibodies (sdAb, also known as nanobodies or VHH), comprise the smallest known antigen binding fragments (12-15 kDa), approximately one-tenth the size of conventional antibodies. This can enable them to reach and recognize relatively inaccessible epitopes that are not recognized by conventional antibodies. Despite their small size, sdAbs display a high level of specificity and affinity for their antigens and have been shown to have nanomolar affinities for haptens and proteins. They can re-fold to bind antigen after chemical or heat denaturation enabling them to retain the ability to bind antigen after exposure to elevated temperatures. Several studies have found sdAbs to be inherently thermostable, demonstrating antigen binding at elevated temperatures, which suggests they will be well suited for long-term field applications where refrigeration is often not possible. Recognition elements based on sdAb should offer the specificity of conventional antibodies with the potential for use and storage at elevated temperatures and the regeneration of sensor surfaces. The general sequences of sdAb are composed of three diverse complementarity determining regions (CDRs) termed CDR1, CDR2, and CDR3, and four more conserved framework regions (FRs). The epitope binding of a particular sdAb is determined primarily by the CDRs, with CDR3 being the dominating contributor in antigen recognition.

SdAb also offer several attractive features for therapeutic applications. Again their stability can make them stable at room temperature whereas most antibody therapeutics require refrigeration. Their small size means that the same weight of protein will have greater specific activity and will diffuse much faster throughout the tissue. Its lack of an Fc domain may also be beneficial for the case of VEEV therapeutics where the Fc-mediated effects of the immune response appear to be responsible for much long term negative impact of VEEV infection, namely the polyarthritis.

BRIEF SUMMARY

In one embodiment, an isolated variable domain of a camelid heavy-chain antibody (VHH), also known as a single domain antibody (sdAb) or nanobody, directed against Venezuelan equine encephalitis virus (VEEV), comprises an amino acid sequence with overall amino acid sequence identity of at least 70% to a sequence a selected from the group consisting of SEQ ID Nos. 1-8 while having an amino acid sequence identity in CDR1, CDR2, and CDR3 regions of at least 75%.

A second embodiment is a sdAb of the first embodiment having an overall amino acid sequence identity of at least 71, 72, 73, 74, 75, 76, 77, 78, 79, 80, 81, 82, 83, 84, 85, 86, 87, 88, 89, 90, 91, 92, 93, 94, 95, 96, 97, 98, 99 or 100% with a sequence selected from the group consisting of SEQ ID NO: 1, SEQ ID NO: 2, SEQ ID NO: 3, SEQ ID NO: 4, and SEQ ID NO: 5.

A third embodiment is a sdAb of the first or second embodiment wherein the amino acid sequence identity in each of the CDR1, CDR2, and CDR3 regions is greater than 75%, for example 76, 77, 78, 79, 80, 81, 82, 83, 84, 85, 86, 87, 88, 89, 90, 91, 92, 93, 94, 95, 96, 97, 98, 99 or 100%.

In a further embodiment, an isolated antibody comprises two of the above-described sdAbs joined together by a peptide linker.

Another embodiment is a polypeptide comprising an sdAb according to any of the above embodiments incorporating an additional amino sequence configured to provide a desired function.

In another embodiment, a method of detecting VEEV includes contacting a sample known or suspected to contain VEEV with a bound or immobilized antibody of a previous embodiment under conditions that permit antigen binding thereto; and rinsing the antibody to remove unbound components, wherein at least a portion of any VEEV in the sample remains bound to the antibody, thereby following additional steps as necessary producing a response indicative of the presence of VEEV in the sample. In another aspect, the sample is from a patient and, if VEEV is detected in the sample, then the patient is provided with suitable treatment against VEEV infection.

Yet another embodiment is a medicament comprising one or more antibodies as described above together with a pharmaceutically-acceptable carrier A still further embodiment is a method of treatment comprising administering a medicament embodiment to an individual in need thereof.

BRIEF DESCRIPTION OF THE DRAWINGS

FIG. 2 provides a sequence alignment of sdAb that bind VEEV. These sdAb fall into five different families based on similarities in their complementarity-determining region three (CDR3) sequences, which occurs at numbered positions 97-114.

FIGS. 3A and 3B show data from assays in a plaque reduction neutralization test (PRNT) format, shows the ability of sdAbs and linked fusions of certain of the sdAbs, respectively, to inhibit infection of cells by the TC83 strain of VEEV.

DETAILED DESCRIPTION

Definitions

Figure 1:
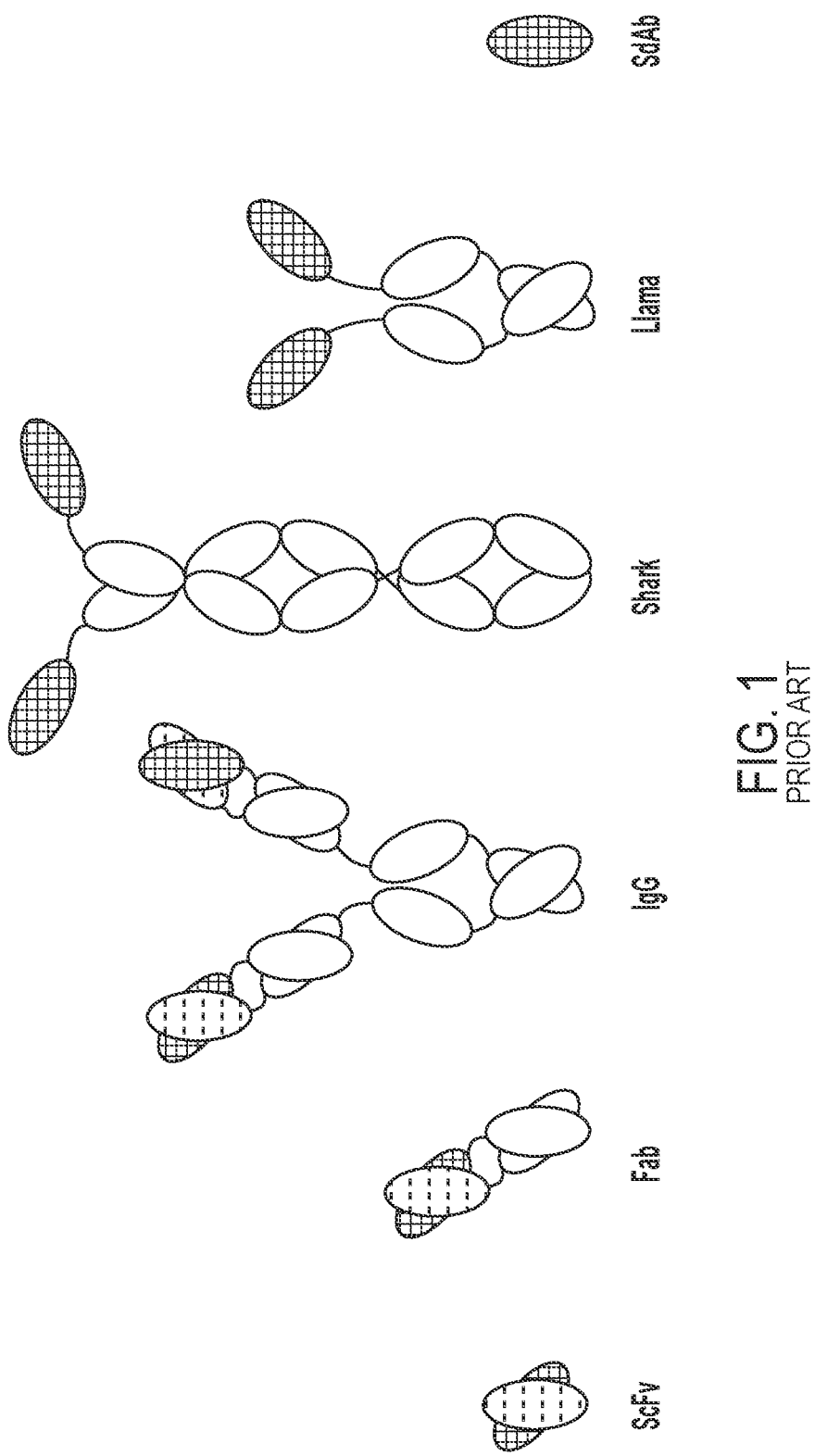
FIG. 1 is a schematic showing antibodies and recombinant derivatives. Other than sdAb, all those depicted exhibit a multi-domain nature. The heavy variable domains are shown with grid shading, light domains are lightly shaded with horizontal lines, and the constant domains is unshaded.

Before describing the present invention in detail, it is to be understood that the terminology used in the specification is for the purpose of describing particular embodiments, and is not necessarily intended to be limiting. Although many methods, structures and materials similar, modified, or equivalent to those described herein can be used in the practice of the present invention without undue experimentation, the preferred methods, structures and materials are described herein. In describing and claiming the present invention, the following terminology will be used in accordance with the definitions set out below.

As used herein, the singular forms "a", "an," and "the" do not preclude plural referents, unless the content clearly dictates otherwise.

As used herein, the term "and/or" includes any and all combinations of one or more of the associated listed items.

As used herein, the term "about" when used in conjunction with a stated numerical value or range denotes somewhat more or somewhat less than the stated value or range, to within a range of +10% of that stated.

A "subject" as used herein is preferably a mammal, for instance, an equine, a rodent, e.g., a mouse, a rat, or a non-human-primate, or a human.

Overview

Described herein are several single domain antibodies (sdAb; also known as nanobodies or VHH) that bind to Venezuelan equine encephalitis virus (VEEV). These sdAb have the potential to be used in therapeutic applications and can also be used for detection of the virus in immunoassays.

The general sequences of sdAb are composed of three diverse complementarity determining regions (CDRs) and four more conserved framework regions (FRs). The epitope binding is determined mainly by CDR3.

EXAMPLES

A llama was immunized using an equine vaccine (West Nile Innovator+VEWT) that contained killed Venezuelan equine encephalitis virus (VEEV). Following a series of immunizations, total RNA isolated from the llama's peripheral blood mononuclear cells (PBMCs) was purified. This total RNA was used to create a phage display library of the variable heavy domains of the llama heavy chain only antibodies.

Figure 2:
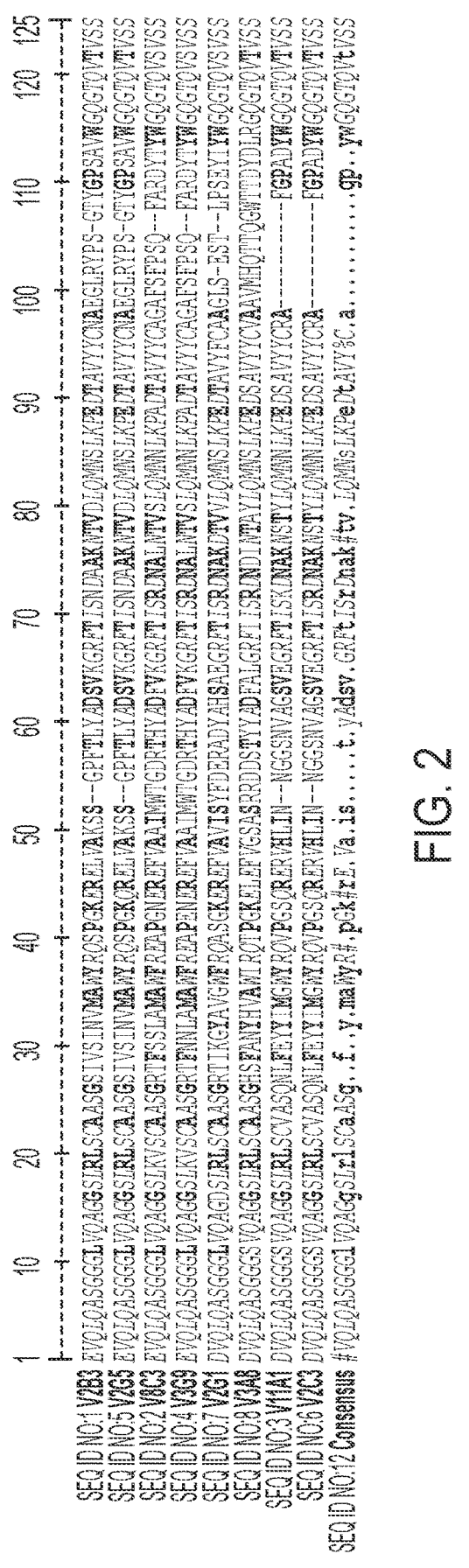

Five sequence families of anti-VEEV sdAb were selected from the immune phage display library, with a sequence family defined as a group of sdAb sharing a high degree of similarity in the CDR3 region, as seen in FIG. 2. Herein, we define CDR1 as region of amino acid residues numbered 26-35 in FIG. 2, CDR 2 as those numbered 50-65, and CDR3 as those numbered 97-114.

The VEEV specific binders were isolated by a biopanning procedure on immobilized killed VEEV (Strain TC-83). The selected sequences were subcloned for protein preparation. A subset of prepared sdAb were then subjected to the binding assays and found to be positive for binding TC-83 by Magplex assay.

The specific amino acid sequences for the group of anti-VEEV sdAb selected from biopanning and the analyses of the representative clones are the subject of this disclosure. Anti-VEEV amino acid sequences are described as follows:

(V2B3)
SEQ ID NO: 1
EVQLQASGGGLVQAGGSLRLSCAASGSIVSINVMAWYRQSPGKERELVAK
SSGPFTLYADSVKGRFTISNDAAKNTVDLQMNSLKPEDTAVYYCNAEGLR
YPSGTYGPSAVWGQGTQVTVSS (V8C3)
SEQ ID NO: 2
EVQLQASGGGLVQAGGSLKVSCAASGRTFSSLAMAWFREAPGNEREFVAA
IMWTGDRTHYADFVKGRFTISRDNALNTVSLQMNNLKPADTAVYYCAGAF
SFPSQFARDYTYWGQGTQVSVSS (V11A1)
SEQ ID NO: 3
DVQLQASGGGSVQAGGSLRLSCVASQNLFEYYTMGWYRQVPGSQRERVAL
INNGGSNVAGSVEGRFTISKDNAKNSIYLQMNNLKPEDSAVYYCRAFGPA
DYWGQGTQVTVSS (V3G9)
SEQ ID NO: 4
EVQLQASGGGLVQAGGSLKVSCAASGRTFNNLAMAWFREAPENEREFVAA
IMWTGDRTHYADFVKGRYTISRDNALNTVSLQMNNLKPADTAVYYCAGAF
SFPSQFARDYTYWGQGTQVSVSS (V2G5)
SEQ ID NO: 5
EVQLQASGGGLVQAGGSLRLSCAASGSIVSINVMAWYRQSPGKQRELVAK
SSGPFTLYADSVKGRFTISNDAAKNTVDLQMNSLKPEDTAVYYCNAEGLR
YPSGTYGPSAVWGQGTQVTVSS (V2C3)
SEQ ID NO: 6
DVQLQASGGGSVQAGGSLRLSCVASQNLFEYYTMGWYRQVPGSQRERVAL
INNGGSNVAGSVEGRFTISRDNAKNSIYLQMNNLKPEDSAVYYCRAFGPA
DYWGQGTQVTVSS (V2G1)
SEQ ID NO: 7
DVQLQASGGGLVQAGDSLRLSCAASGRTIKGYAVGWFRQASGKEREFVAV
ISYFDERADYAHSAEGRFTISRDNAKDTVVLQMNSLKPEDTAVYFCAAGL
SESTLPSEYIYWGQGTQVSVSS (V3A8)
SEQ ID NO: 8
DVQLQASGGGSVQAGGSLRLSCAASGHSFANYIIVAWIRQTPGKECEFVG
SASRRDDSTYYADFALGRFIISRDNDINTAYLQMNSLKPEDSAVYYCVAA
VMAQTTQGWTTDYDLRGQGTQVTVSS

Also depicted in FIG. 2 is the consensus sequence having SEQ ID NO: 12 as follows:

XVQLQASGGGSVQAGGXVQAGXSLXXSCXASXXXXXXXXXXXWXRXXXGXX
XEXVXXXXXXXXXXXXAXXXXGRFXISXDXXXXXXXLQMNXLKPXDXAV
YXCXXXXXXXXXXXXXXXXXXGQGTQVXVSS

Several of the sdAb were tested for virus neutralization in a plaque reduction neutralization test (PRNT) where added sdAb is able prevent the infection of cell by the virus. The average of the duplicates was used to calculate 50% and 80% plaque reduction neutralization titer (PRNT50 and PRNT80). FIG. 3A shows the ability of each sdAb to inhibit the TC83 strain of VEEV in PRNT assays.

Also examined were genetic fusions of the sdAb include where two individual sdAb were joined through a polypeptide linker. For example V2B3 and a derivative of V3A8 termed V3A8f (SEQ ID NO: 9) were linked through a glycine-serine based linker having SEQ ID NO: 13 to produce V2B3-V3A8f (sequence SEQ ID NO: 10) and V3A8f-V2B3 (SEQ ID NO: 11). The sequences of each of these are provided below.

(V3A8f)
SEQ ID NO: 9
DVQLQASGGGSVQAGGSLRLSCAASGHSFANYHVAWIRQTPGKEREFVGS
ASRRDDSTYYADFALGRFIISRDNDINTAYLQMNSLKPEDSAVYYCVAAV
MAQTTQGWTTDYDLRGQGTQVTVSS (V2B3-V3A8f)
SEQ ID NO: 10
EVQLQASGGGLVQAGGSLRLSCAASGSIVSINVMAWYRQSPGKERELVAK
SSGPFTLYADSVKGRFTISNDAAKNTVDLQMNSLKPEDTAVYYCNAEGLR
YPSGTYGPSAVWGQGTQVTVSSAAAGGGGSGGGGSGGGGSGSDVQLQASG
GGSVQAGGSLRLSCAASGHSFANYHVAWIRQTPGKEREFVGSASRRDDST
YYADFALGRFIISRDNDINTAYLQMNSLKPEDSAVYYCVAAVMAQTTQGW
TTDYDLRGQGTQVTVSS (V3A8-V2B3)
SEQ ID NO: 11
DVQLQASGGGSVQAGGSLRLSCAASGHSFANYHVAWIRQTPGKEREFVGS
ASRRDDSTYYADFALGRFIISRDNDINTAYLQMNSLKPEDSAVYYCVAAV
MAQTTQGWTTDYDLRGQGTQVTVSSAAAGGGGSGGGGSGGGGSGSEVQLQ
ASGGGLVQAGGSLRLSCAASGSIVSINVMAWYRQSPGKERELVAKSSGPF
TLYADSVKGRFTISNDAAKNTVDLQMNSLKPEDTAVYYCNAEGLRYPSGT
YGPSAVWGQGTQVTVSS

SEQ ID NO: 13 (linker):
AAAGGGGSGGGGSGGGGSGS

Several other fusions were made similarly. In each case, the fusion involved two sdAb joined by the linker of SEQ ID NO: 13 as in the above examples. Also tested was a sdAb termed CC3 sdAb, which was previously disclosed in commonly-owned U.S. Pat. No. 11,028,152 and has the following sequence (SEQ ID NO: 14):

EVQLQASGGGSVQAGGSLRLSCVTSQNLFEYYTMGWYRQVPGSQRERVAL
INNGGSTVAGSVEGRFTISRDHAKNSVYLQMNYLKPEDSAVYYCRAFGPA
DYWGQGTQVTVSS

The CC3 sdAb was earlier identified as binding to chikungunya virus, an alphavirus related to VEEV. Because the anti-VEEV library revealed sequences closely related to CC3, tests included this sdAb as well.

FIG. 3B provides comparative data on the ability of these linked structures to neutralize VEEV strain TC83 compared to the monomeric sdAb or a cocktail of the two sdAb. Accordingly, aspects of the disclosure include anti-VEEV antibodies that comprise fusions of two or more individual peptide sequences as described above, optionally with a spacer sequence between them.

FURTHER EMBODIMENTS

It is expected that these sdAb and their derivatives could be used in diagnostic assays. For example, a sample known or suspected to contain VEEV could be contacted with a bound or immobilized antibody that includes a protein sequence as described herein under conditions that permit antigen binding thereto. After rinsing the antibody-antigen complex to remove unbound components, wherein at least a portion of any VEEV in the sample remains bound to the antibody, a response indicative of the presence of VEEV in the sample can be obtained by addition of a second anti-VEEV sdAb tagged with biotin that can be recognized by streptavidin-phycoerythrin for completion of a sandwich fluoroimmunoassay. Use of the antibodies in both capture (bound or immobilized) and/or reporter (for example, tagged with a biotin) format is contemplated. Numerous alternative assay formats known in the art could be realized, such as surface plasmon resonance, MagPlex fluorimmunoassay, enzyme-linked immunosorbent assays (ELISA), and the like.

Variations of the above-described examples are possible. For example, any two individual sdAb, the same or different, could be joined through a polypeptide linker. It would also be possible to join more than two sdAb together to be expressed as a single fusion protein, for example three, four, five, or even more.

Polypeptide linkers could be shorter or longer than those used in the examples; for instance a linker might be 1 to 50 amino acids in length, inclusive. The length of the linker can be tuned by routine experimentation. It is expected that linkers comprising primarily glycine and serine will function as desired. Thus contemplated are linkers comprising at least 50% glycine and/or serine.

Furthermore, one or more sdAb can be joined to another protein in order to provide further functionality. For example, the sdAb(s) could be linked to an enzyme or fluorescent protein to aid in detection assays, and/or to a protein domain (e.g., albumin binding domain) that would enable an increased serum half-life that could be important for therapeutic use. Such joining could be accomplished through the expression of a fusion protein (optionally including a linker as noted above) or through post-translational joining Also contemplated are variants of the above-described sdAbs based on the consensus sequence depicted in FIG. 2. Variants might be programmatically generated, synthesized, and tested for binding using techniques known in the art.

For administration to subjects, such as humans, one may employ pharmaceutical compositions comprising one or more anti-VEEV antibodies and a pharmaceutically acceptable carrier or excipient. In the present context, the term "pharmaceutically acceptable" means that the carrier or excipient, at the dosages and concentrations employed, will not cause any unwanted or harmful effects in the subjects to that they are administered. Such pharmaceutically acceptable carriers and excipients are well known in the art. They preferably are formulated and administered as a sterile solution, although it may also be possible to utilize lyophilized preparations. Sterile solutions are prepared by sterile filtration or by other methods known per se in the art. The solutions are then lyophilized or filled into pharmaceutical dosage containers. The pH of the solution generally is in the range of pH 3.0 to 9.5, e.g., pH 5.0 to 7.5. The anti-VEEV antibodies typically are in a solution having a suitable pharmaceutically acceptable buffer, and the composition may also contain a salt. Optionally, stabilizing agent may be present, such as albumin. In certain embodiments, detergent is added. In certain embodiments, the anti-VEEV antibodies may be formulated into an injectable preparation.

Compositions may be administered to a subject, e.g., a human subject or an equine subject. The total dose of anti-VEEV antibodies in a composition for a single administration can, for instance, be about 0.01 µg to much greater levels, particularly for treatment of adult equines (e.g., about 50 grams). Expected human dosages might be in the rage of about 100 mg to about 5 grams. Determining the recommended dose will be carried out by experimentation and is routine for those skilled in the art.

Administration of the compositions according to the disclosure can be performed using standard routes of administration. Non-limiting embodiments include parenteral administration, such as intradermal, intramuscular, subcutaneous, transcutaneous, or mucosal administration, e.g., intranasal, oral, and the like. In one embodiment, a composition is administered by intramuscular injection.

ADVANTAGES

As compared to traditional antibodies, sdAb are small and have better penetration to tissues and have a greater probability of crossing the blood brain barrier. This can assist in diagnostic and therapeutic applications for the treatment of VEEV infection, particularly to treat or prevent encephalitis. While on the surface scFv have many similarities to sdAb, they have serious limitations: first, their production is much more difficult; second, they tend to multimerize and aggregate upon storage and are less stable to radiolabeling; and third, they are twice the size of sdAb and would have poorer tissue penetration and be less likely to cross the blood brain barrier.

These new sequences represent rugged reagents that have potential uses as therapeutics and in detection assays. Whereas conventional antibodies will require cold storage and cannot be easily tailored to work optimally with various detection platforms, sdAb being rugged recombinant binding molecules can be engineered to be even more thermally stable if need be, but they naturally have robust stability being able to refold if denatured, and they can also be expressed with a variety of fusion domains to enhance their utility. Fusion constructs based on sdAb can also be advantageous for tailoring the half-life of therapeutic reagents.

What is claimed is:

1. An isolated antibody comprising a protein sequence comprising one or more sdABs selected from the group consisting of SEQ ID NOs. 1-8, wherein the antibody has binding activity against the Venezuelan equine encephalitis virus (VEEV).

2. The isolated antibody of claim 1, wherein the protein sequence comprises exactly two sdAbs joined via a polypeptide linker.

* * * * *

SEQUENCE LISTING

<160> NUMBER OF SEQ ID NOS: 14

<210> SEQ ID NO 1
<211> LENGTH: 122
<212> TYPE: PRT

```
<213> ORGANISM: Artificial Sequence
<220> FEATURE:
<223> OTHER INFORMATION: synthetic construct

<400> SEQUENCE: 1

Glu Val Gln Leu Gln Ala Ser Gly Gly Gly Leu Val Gln Ala Gly Gly
1               5                   10                  15

Ser Leu Arg Leu Ser Cys Ala Ala Ser Gly Ser Ile Val Ser Ile Asn
            20                  25                  30

Val Met Ala Trp Tyr Arg Gln Ser Pro Gly Lys Glu Arg Glu Leu Val
        35                  40                  45

Ala Lys Ser Ser Gly Pro Phe Thr Leu Tyr Ala Asp Ser Val Lys Gly
    50                  55                  60

Arg Phe Thr Ile Ser Asn Asp Ala Ala Lys Asn Thr Val Asp Leu Gln
65                  70                  75                  80

Met Asn Ser Leu Lys Pro Glu Asp Thr Ala Val Tyr Tyr Cys Asn Ala
                85                  90                  95

Glu Gly Leu Arg Tyr Pro Ser Gly Thr Tyr Gly Pro Ser Ala Val Trp
            100                 105                 110

Gly Gln Gly Thr Gln Val Thr Val Ser Ser
        115                 120

<210> SEQ ID NO 2
<211> LENGTH: 123
<212> TYPE: PRT
<213> ORGANISM: Artificial Sequence
<220> FEATURE:
<223> OTHER INFORMATION: synthetic construct

<400> SEQUENCE: 2

Glu Val Gln Leu Gln Ala Ser Gly Gly Gly Leu Val Gln Ala Gly Gly
1               5                   10                  15

Ser Leu Lys Val Ser Cys Ala Ala Ser Gly Arg Thr Phe Ser Ser Leu
            20                  25                  30

Ala Met Ala Trp Phe Arg Glu Ala Pro Gly Asn Glu Arg Glu Phe Val
        35                  40                  45

Ala Ala Ile Met Trp Thr Gly Asp Arg Thr His Tyr Ala Asp Phe Val
    50                  55                  60

Lys Gly Arg Phe Thr Ile Ser Arg Asp Asn Ala Leu Asn Thr Val Ser
65                  70                  75                  80

Leu Gln Met Asn Asn Leu Lys Pro Ala Asp Thr Ala Val Tyr Tyr Cys
                85                  90                  95

Ala Gly Ala Phe Ser Phe Pro Ser Gln Phe Ala Arg Asp Tyr Thr Tyr
            100                 105                 110

Trp Gly Gln Gly Thr Gln Val Ser Val Ser Ser
        115                 120

<210> SEQ ID NO 3
<211> LENGTH: 113
<212> TYPE: PRT
<213> ORGANISM: Artificial Sequence
<220> FEATURE:
<223> OTHER INFORMATION: synthetic construct

<400> SEQUENCE: 3

Asp Val Gln Leu Gln Ala Ser Gly Gly Gly Ser Val Gln Ala Gly Gly
1               5                   10                  15

Ser Leu Arg Leu Ser Cys Val Ala Ser Gln Asn Leu Phe Glu Tyr Tyr
            20                  25                  30
```

Thr Met Gly Trp Tyr Arg Gln Val Pro Gly Ser Gln Arg Glu Arg Val
            35                  40                  45

Ala Leu Ile Asn Asn Gly Gly Ser Asn Val Ala Gly Ser Val Glu Gly
         50                  55                  60

Arg Phe Thr Ile Ser Lys Asp Asn Ala Lys Asn Ser Ile Tyr Leu Gln
 65                  70                  75                  80

Met Asn Asn Leu Lys Pro Glu Asp Ser Ala Val Tyr Tyr Cys Arg Ala
                 85                  90                  95

Phe Gly Pro Ala Asp Tyr Trp Gly Gln Gly Thr Gln Val Thr Val Ser
                100                 105                 110

Ser

<210> SEQ ID NO 4
<211> LENGTH: 123
<212> TYPE: PRT
<213> ORGANISM: Artificial Sequence
<220> FEATURE:
<223> OTHER INFORMATION: synthetic construct

<400> SEQUENCE: 4

Glu Val Gln Leu Gln Ala Ser Gly Gly Gly Leu Val Gln Ala Gly Gly
 1               5                  10                  15

Ser Leu Lys Val Ser Cys Ala Ala Ser Gly Arg Thr Phe Asn Asn Leu
                 20                  25                  30

Ala Met Ala Trp Phe Arg Glu Ala Pro Glu Asn Glu Arg Glu Phe Val
             35                  40                  45

Ala Ala Ile Met Trp Thr Gly Asp Arg Thr His Tyr Ala Asp Phe Val
         50                  55                  60

Lys Gly Arg Tyr Thr Ile Ser Arg Asp Asn Ala Leu Asn Thr Val Ser
 65                  70                  75                  80

Leu Gln Met Asn Asn Leu Lys Pro Ala Asp Thr Ala Val Tyr Tyr Cys
                 85                  90                  95

Ala Gly Ala Phe Ser Phe Pro Ser Gln Phe Ala Arg Asp Tyr Thr Tyr
                100                 105                 110

Trp Gly Gln Gly Thr Gln Val Ser Val Ser Ser
            115                 120

<210> SEQ ID NO 5
<211> LENGTH: 122
<212> TYPE: PRT
<213> ORGANISM: Artificial Sequence
<220> FEATURE:
<223> OTHER INFORMATION: synthetic construct

<400> SEQUENCE: 5

Glu Val Gln Leu Gln Ala Ser Gly Gly Gly Leu Val Gln Ala Gly Gly
 1               5                  10                  15

Ser Leu Arg Leu Ser Cys Ala Ala Ser Gly Ser Ile Val Ser Ile Asn
                 20                  25                  30

Val Met Ala Trp Tyr Arg Gln Ser Pro Gly Lys Gln Arg Glu Leu Val
             35                  40                  45

Ala Lys Ser Ser Gly Pro Phe Thr Leu Tyr Ala Asp Ser Val Lys Gly
         50                  55                  60

Arg Phe Thr Ile Ser Asn Asp Ala Ala Lys Asn Thr Val Asp Leu Gln
 65                  70                  75                  80

Met Asn Ser Leu Lys Pro Glu Asp Thr Ala Val Tyr Tyr Cys Asn Ala
                 85                  90                  95

Glu Gly Leu Arg Tyr Pro Ser Gly Thr Tyr Gly Pro Ser Ala Val Trp
            100                 105                 110

Gly Gln Gly Thr Gln Val Thr Val Ser Ser
            115                 120

<210> SEQ ID NO 6
<211> LENGTH: 113
<212> TYPE: PRT
<213> ORGANISM: Artificial Sequence
<220> FEATURE:
<223> OTHER INFORMATION: synthetic construct

<400> SEQUENCE: 6

Asp Val Gln Leu Gln Ala Ser Gly Gly Gly Val Gln Ala Gly Gly
1               5                   10                  15

Ser Leu Arg Leu Ser Cys Val Ala Ser Gln Asn Leu Phe Glu Tyr Tyr
                20                  25                  30

Thr Met Gly Trp Tyr Arg Gln Val Pro Gly Ser Gln Arg Glu Arg Val
            35                  40                  45

Ala Leu Ile Asn Asn Gly Gly Ser Asn Val Ala Gly Ser Val Glu Gly
        50                  55                  60

Arg Phe Thr Ile Ser Arg Asp Asn Ala Lys Asn Ser Ile Tyr Leu Gln
65                  70                  75                  80

Met Asn Asn Leu Lys Pro Glu Asp Ser Ala Val Tyr Tyr Cys Arg Ala
                85                  90                  95

Phe Gly Pro Ala Asp Tyr Trp Gly Gln Gly Thr Gln Val Thr Val Ser
            100                 105                 110

Ser

<210> SEQ ID NO 7
<211> LENGTH: 122
<212> TYPE: PRT
<213> ORGANISM: Artificial Sequence
<220> FEATURE:
<223> OTHER INFORMATION: synthetic construct

<400> SEQUENCE: 7

Asp Val Gln Leu Gln Ala Ser Gly Gly Gly Leu Val Gln Ala Gly Asp
1               5                   10                  15

Ser Leu Arg Leu Ser Cys Ala Ala Ser Gly Arg Thr Ile Lys Gly Tyr
                20                  25                  30

Ala Val Gly Trp Phe Arg Gln Ala Ser Gly Lys Glu Arg Glu Phe Val
            35                  40                  45

Ala Val Ile Ser Tyr Phe Asp Glu Arg Ala Asp Tyr Ala His Ser Ala
        50                  55                  60

Glu Gly Arg Phe Thr Ile Ser Arg Asp Asn Ala Lys Asp Thr Val Val
65                  70                  75                  80

Leu Gln Met Asn Ser Leu Lys Pro Glu Asp Thr Ala Val Tyr Phe Cys
                85                  90                  95

Ala Ala Gly Leu Ser Glu Ser Thr Leu Pro Ser Glu Tyr Ile Tyr Trp
            100                 105                 110

Gly Gln Gly Thr Gln Val Ser Val Ser Ser
            115                 120

<210> SEQ ID NO 8
<211> LENGTH: 125
<212> TYPE: PRT
<213> ORGANISM: Artificial Sequence

```
<220> FEATURE:
<223> OTHER INFORMATION: synthetic construct

<400> SEQUENCE: 8

Asp Val Gln Leu Gln Ala Ser Gly Gly Gly Ser Val Gln Ala Gly Gly
1               5                   10                  15

Ser Leu Arg Leu Ser Cys Ala Ala Ser Gly His Ser Phe Ala Asn Tyr
            20                  25                  30

His Val Ala Trp Ile Arg Gln Thr Pro Gly Lys Glu Arg Glu Phe Val
        35                  40                  45

Gly Ser Ala Ser Arg Arg Asp Asp Ser Thr Tyr Tyr Ala Asp Phe Ala
    50                  55                  60

Leu Gly Arg Phe Ile Ile Ser Arg Asp Asn Asp Ile Asn Thr Ala Tyr
65                  70                  75                  80

Leu Gln Met Asn Ser Leu Lys Pro Glu Asp Ser Ala Val Tyr Tyr Cys
                85                  90                  95

Val Ala Ala Val Met Ala Gln Thr Thr Gln Gly Trp Thr Thr Asp Tyr
            100                 105                 110

Asp Leu Arg Gly Gln Gly Thr Gln Val Thr Val Ser Ser
        115                 120                 125

<210> SEQ ID NO 9
<211> LENGTH: 125
<212> TYPE: PRT
<213> ORGANISM: Artificial Sequence
<220> FEATURE:
<223> OTHER INFORMATION: synthetic construct

<400> SEQUENCE: 9

Asp Val Gln Leu Gln Ala Ser Gly Gly Gly Ser Val Gln Ala Gly Gly
1               5                   10                  15

Ser Leu Arg Leu Ser Cys Ala Ala Ser Gly His Ser Phe Ala Asn Tyr
            20                  25                  30

His Val Ala Trp Ile Arg Gln Thr Pro Gly Lys Glu Arg Glu Phe Val
        35                  40                  45

Gly Ser Ala Ser Arg Arg Asp Asp Ser Thr Tyr Tyr Ala Asp Phe Ala
    50                  55                  60

Leu Gly Arg Phe Ile Ile Ser Arg Asp Asn Asp Ile Asn Thr Ala Tyr
65                  70                  75                  80

Leu Gln Met Asn Ser Leu Lys Pro Glu Asp Ser Ala Val Tyr Tyr Cys
                85                  90                  95

Val Ala Ala Val Met Ala Gln Thr Thr Gln Gly Trp Thr Thr Asp Tyr
            100                 105                 110

Asp Leu Arg Gly Gln Gly Thr Gln Val Thr Val Ser Ser
        115                 120                 125

<210> SEQ ID NO 10
<211> LENGTH: 267
<212> TYPE: PRT
<213> ORGANISM: Artificial Sequence
<220> FEATURE:
<223> OTHER INFORMATION: synthetic construct

<400> SEQUENCE: 10

Glu Val Gln Leu Gln Ala Ser Gly Gly Gly Leu Val Gln Ala Gly Gly
1               5                   10                  15

Ser Leu Arg Leu Ser Cys Ala Ala Ser Gly Ser Ile Val Ser Ile Asn
            20                  25                  30
```

-continued

Val Met Ala Trp Tyr Arg Gln Ser Pro Gly Lys Glu Arg Glu Leu Val
         35                  40                  45

Ala Lys Ser Ser Gly Pro Phe Thr Leu Tyr Ala Asp Ser Val Lys Gly
 50                  55                  60

Arg Phe Thr Ile Ser Asn Asp Ala Ala Lys Asn Thr Val Asp Leu Gln
 65                  70                  75                  80

Met Asn Ser Leu Lys Pro Glu Asp Thr Ala Val Tyr Tyr Cys Asn Ala
                 85                  90                  95

Glu Gly Leu Arg Tyr Pro Ser Gly Thr Tyr Gly Pro Ser Ala Val Trp
                100                 105                 110

Gly Gln Gly Thr Gln Val Thr Val Ser Ser Ala Ala Gly Gly Gly
            115                 120                 125

Gly Ser Gly Gly Gly Gly Ser Gly Gly Gly Gly Ser Gly Ser Asp Val
    130                 135                 140

Gln Leu Gln Ala Ser Gly Gly Gly Ser Val Gln Ala Gly Gly Ser Leu
145                 150                 155                 160

Arg Leu Ser Cys Ala Ala Ser Gly His Ser Phe Ala Asn Tyr His Val
                165                 170                 175

Ala Trp Ile Arg Gln Thr Pro Gly Lys Glu Arg Glu Phe Val Gly Ser
            180                 185                 190

Ala Ser Arg Arg Asp Asp Ser Thr Tyr Tyr Ala Asp Phe Ala Leu Gly
    195                 200                 205

Arg Phe Ile Ile Ser Arg Asp Asn Asp Ile Asn Thr Ala Tyr Leu Gln
    210                 215                 220

Met Asn Ser Leu Lys Pro Glu Asp Ser Ala Val Tyr Tyr Cys Val Ala
225                 230                 235                 240

Ala Val Met Ala Gln Thr Thr Gln Gly Trp Thr Thr Asp Tyr Asp Leu
                245                 250                 255

Arg Gly Gln Gly Thr Gln Val Thr Val Ser Ser
                260                 265

<210> SEQ ID NO 11
<211> LENGTH: 267
<212> TYPE: PRT
<213> ORGANISM: Artificial Sequence
<220> FEATURE:
<223> OTHER INFORMATION: synthetic construct

<400> SEQUENCE: 11

Asp Val Gln Leu Gln Ala Ser Gly Gly Gly Ser Val Gln Ala Gly Gly
 1               5                  10                  15

Ser Leu Arg Leu Ser Cys Ala Ala Ser Gly His Ser Phe Ala Asn Tyr
                 20                  25                  30

His Val Ala Trp Ile Arg Gln Thr Pro Gly Lys Glu Arg Glu Phe Val
             35                  40                  45

Gly Ser Ala Ser Arg Arg Asp Asp Ser Thr Tyr Tyr Ala Asp Phe Ala
 50                  55                  60

Leu Gly Arg Phe Ile Ile Ser Arg Asp Asn Asp Ile Asn Thr Ala Tyr
 65                  70                  75                  80

Leu Gln Met Asn Ser Leu Lys Pro Glu Asp Ser Ala Val Tyr Tyr Cys
                 85                  90                  95

Val Ala Ala Val Met Ala Gln Thr Thr Gln Gly Trp Thr Thr Asp Tyr
                100                 105                 110

Asp Leu Arg Gly Gln Gly Thr Gln Val Thr Val Ser Ser Ala Ala Ala
            115                 120                 125

```
Gly Gly Gly Gly Ser Gly Gly Gly Ser Gly Gly Gly Ser Gly
        130                 135                 140

Ser Glu Val Gln Leu Gln Ala Ser Gly Gly Leu Val Gln Ala Gly
145                 150                 155                 160

Gly Ser Leu Arg Leu Ser Cys Ala Ala Ser Gly Ser Ile Val Ser Ile
                165                 170                 175

Asn Val Met Ala Trp Tyr Arg Gln Ser Pro Gly Lys Glu Arg Glu Leu
            180                 185                 190

Val Ala Lys Ser Ser Gly Pro Phe Thr Leu Tyr Ala Asp Ser Val Lys
        195                 200                 205

Gly Arg Phe Thr Ile Ser Asn Asp Ala Ala Lys Asn Thr Val Asp Leu
    210                 215                 220

Gln Met Asn Ser Leu Lys Pro Glu Asp Thr Ala Val Tyr Tyr Cys Asn
225                 230                 235                 240

Ala Glu Gly Leu Arg Tyr Pro Ser Gly Thr Tyr Gly Pro Ser Ala Val
                245                 250                 255

Trp Gly Gln Gly Thr Gln Val Thr Val Ser Ser
            260                 265
```

<210> SEQ ID NO 12
<211> LENGTH: 131
<212> TYPE: PRT
<213> ORGANISM: Artificial Sequence
<220> FEATURE:
<223> OTHER INFORMATION: synthetic construct
<220> FEATURE:
<221> NAME/KEY: misc_feature
<222> LOCATION: (1)..(1)
<223> OTHER INFORMATION: Xaa can be any naturally occurring amino acid
<220> FEATURE:
<221> NAME/KEY: misc_feature
<222> LOCATION: (17)..(17)
<223> OTHER INFORMATION: Xaa can be any naturally occurring amino acid
<220> FEATURE:
<221> NAME/KEY: misc_feature
<222> LOCATION: (22)..(22)
<223> OTHER INFORMATION: Xaa can be any naturally occurring amino acid
<220> FEATURE:
<221> NAME/KEY: misc_feature
<222> LOCATION: (25)..(26)
<223> OTHER INFORMATION: Xaa can be any naturally occurring amino acid
<220> FEATURE:
<221> NAME/KEY: misc_feature
<222> LOCATION: (29)..(29)
<223> OTHER INFORMATION: Xaa can be any naturally occurring amino acid
<220> FEATURE:
<221> NAME/KEY: misc_feature
<222> LOCATION: (32)..(41)
<223> OTHER INFORMATION: Xaa can be any naturally occurring amino acid
<220> FEATURE:
<221> NAME/KEY: misc_feature
<222> LOCATION: (43)..(43)
<223> OTHER INFORMATION: Xaa can be any naturally occurring amino acid
<220> FEATURE:
<221> NAME/KEY: misc_feature
<222> LOCATION: (45)..(47)
<223> OTHER INFORMATION: Xaa can be any naturally occurring amino acid
<220> FEATURE:
<221> NAME/KEY: misc_feature
<222> LOCATION: (49)..(51)
<223> OTHER INFORMATION: Xaa can be any naturally occurring amino acid
<220> FEATURE:
<221> NAME/KEY: misc_feature
<222> LOCATION: (53)..(53)
<223> OTHER INFORMATION: Xaa can be any naturally occurring amino acid
<220> FEATURE:
<221> NAME/KEY: misc_feature
<222> LOCATION: (55)..(67)
<223> OTHER INFORMATION: Xaa can be any naturally occurring amino acid
<220> FEATURE:

```
<221> NAME/KEY: misc_feature
<222> LOCATION: (69)..(72)
<223> OTHER INFORMATION: Xaa can be any naturally occurring amino acid
<220> FEATURE:
<221> NAME/KEY: misc_feature
<222> LOCATION: (76)..(76)
<223> OTHER INFORMATION: Xaa can be any naturally occurring amino acid
<220> FEATURE:
<221> NAME/KEY: misc_feature
<222> LOCATION: (79)..(79)
<223> OTHER INFORMATION: Xaa can be any naturally occurring amino acid
<220> FEATURE:
<221> NAME/KEY: misc_feature
<222> LOCATION: (81)..(87)
<223> OTHER INFORMATION: Xaa can be any naturally occurring amino acid
<220> FEATURE:
<221> NAME/KEY: misc_feature
<222> LOCATION: (92)..(92)
<223> OTHER INFORMATION: Xaa can be any naturally occurring amino acid
<220> FEATURE:
<221> NAME/KEY: misc_feature
<222> LOCATION: (96)..(96)
<223> OTHER INFORMATION: Xaa can be any naturally occurring amino acid
<220> FEATURE:
<221> NAME/KEY: misc_feature
<222> LOCATION: (98)..(98)
<223> OTHER INFORMATION: Xaa can be any naturally occurring amino acid
<220> FEATURE:
<221> NAME/KEY: misc_feature
<222> LOCATION: (102)..(102)
<223> OTHER INFORMATION: Xaa can be any naturally occurring amino acid
<220> FEATURE:
<221> NAME/KEY: misc_feature
<222> LOCATION: (104)..(121)
<223> OTHER INFORMATION: Xaa can be any naturally occurring amino acid
<220> FEATURE:
<221> NAME/KEY: misc_feature
<222> LOCATION: (128)..(128)
<223> OTHER INFORMATION: Xaa can be any naturally occurring amino acid

<400> SEQUENCE: 12

Xaa Val Gln Leu Gln Ala Ser Gly Gly Gly Ser Val Gln Ala Gly Gly
  1               5                  10                  15

Xaa Val Gln Ala Gly Xaa Ser Leu Xaa Xaa Ser Cys Xaa Ala Ser Xaa
             20                  25                  30

Xaa Xaa Xaa Xaa Xaa Xaa Xaa Xaa Xaa Trp Xaa Arg Xaa Xaa Xaa Gly
         35                  40                  45

Xaa Xaa Xaa Glu Xaa Val Xaa Xaa Xaa Xaa Xaa Xaa Xaa Xaa Xaa Xaa
     50                  55                  60

Xaa Xaa Xaa Ala Xaa Xaa Xaa Xaa Gly Arg Phe Xaa Ile Ser Xaa Asp
 65                  70                  75                  80

Xaa Xaa Xaa Xaa Xaa Xaa Xaa Leu Gln Met Asn Xaa Leu Lys Pro Xaa
                 85                  90                  95

Asp Xaa Ala Val Tyr Xaa Cys Xaa Xaa Xaa Xaa Xaa Xaa Xaa Xaa Xaa
            100                 105                 110

Xaa Xaa Xaa Xaa Xaa Xaa Xaa Xaa Xaa Gly Gln Gly Thr Gln Val Xaa
        115                 120                 125

Val Ser Ser
        130

<210> SEQ ID NO 13
<211> LENGTH: 20
<212> TYPE: PRT
<213> ORGANISM: Artificial Sequence
<220> FEATURE:
<223> OTHER INFORMATION: synthetic construct

<400> SEQUENCE: 13
```

```
Ala Ala Ala Gly Gly Gly Gly Ser Gly Gly Gly Ser Gly Gly Gly
1               5                   10                  15

Gly Ser Gly Ser
            20

<210> SEQ ID NO 14
<211> LENGTH: 113
<212> TYPE: PRT
<213> ORGANISM: Artificial Sequence
<220> FEATURE:
<223> OTHER INFORMATION: synthetic construct

<400> SEQUENCE: 14

Glu Val Gln Leu Gln Ala Ser Gly Gly Gly Ser Val Gln Ala Gly Gly
1               5                   10                  15

Ser Leu Arg Leu Ser Cys Val Thr Ser Gln Asn Leu Phe Glu Tyr Tyr
                20                  25                  30

Thr Met Gly Trp Tyr Arg Gln Val Pro Gly Ser Gln Arg Glu Arg Val
            35                  40                  45

Ala Leu Ile Asn Asn Gly Gly Ser Thr Val Ala Gly Ser Val Glu Gly
        50                  55                  60

Arg Phe Thr Ile Ser Arg Asp His Ala Lys Asn Ser Val Tyr Leu Gln
65                  70                  75                  80

Met Asn Tyr Leu Lys Pro Glu Asp Ser Ala Val Tyr Tyr Cys Arg Ala
                85                  90                  95

Phe Gly Pro Ala Asp Tyr Trp Gly Gln Gly Thr Gln Val Thr Val Ser
            100                 105                 110

Ser
```